No. 717,398. Patented Dec. 30, 1902.
E. HILL, Jr.
TROLLEY WIRE SUPPORT.
(Application filed Apr. 18, 1902.)
(No Model.)
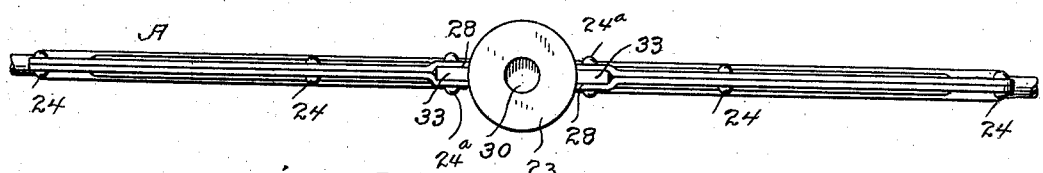
Fig. 1
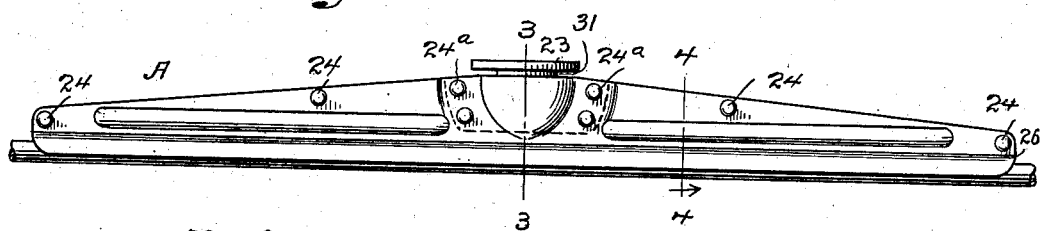
Fig. 2
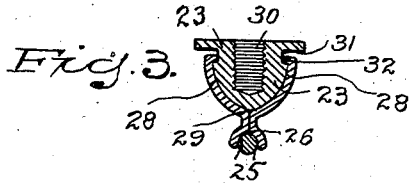
Fig. 3
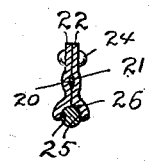
Fig. 4
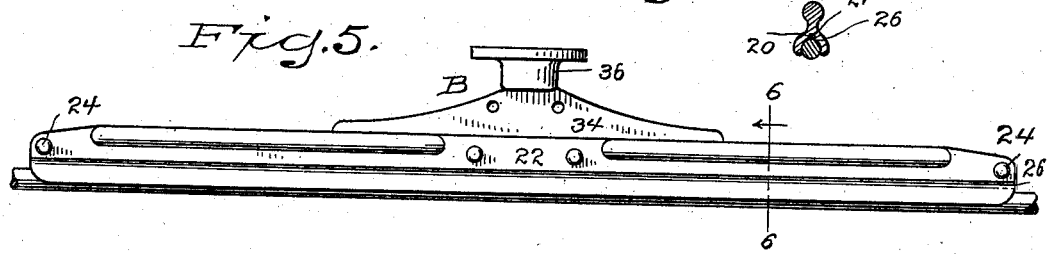
Fig. 5 / Fig. 9
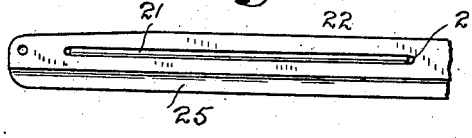
Fig. 7
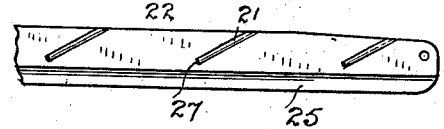
Fig. 8
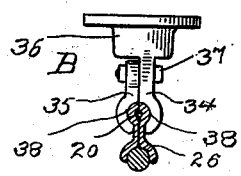
Fig. 6
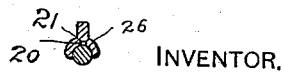
Fig. 10
WITNESSES.
H. A. Lamb
S. W. Atherton
INVENTOR.
Ebenezer Hill Jr.
By A. M. Wooster
Atty.
THE NORRIS PETERS CO., PHOTO-LITHO., WASHINGTON, D. C.

UNITED STATES PATENT OFFICE.

EBENEZER HILL, JR., OF NORWALK, CONNECTICUT.

TROLLEY-WIRE SUPPORT.

SPECIFICATION forming part of Letters Patent No. 717,398, dated December 30, 1902.

Application filed April 18, 1902. Serial No. 103,549. (No model.)

*To all whom it may concern:*

Be it known that I, EBENEZER HILL, Jr., a citizen of the United States, residing at Norwalk, county of Fairfield, State of Connecticut, have invented a new and useful Trolley-Wire Support, of which the following is a specification.

My invention has for its object to produce an ear or trolley-wire support which shall be simple and inexpensive to produce, light and strong, and so constructed that it may be attached to a hub or other overhead support before the wire is attached thereto, thus avoiding the necessity for twisting the wire in order to bring the ear into position for attachment to the support and avoiding any difficulty in the matter of centering the ear and the support.

So far as I am aware the trolley-ears in general use are castings and are necessarily bulky and are left rough on account of the requirement that they be produced at the lowest possible cost. In the ordinary commercial trolley-ear the groove for the trolley-wire is machined and is then tinned by hand. In attaching the ear to the wire the ear is placed beneath the wire and solder is worked down over the wire and into the groove. After the ear has been attached to the wire the wire is twisted half around to place the wire beneath the ear and the ear in position for attachment to a hub or other overhead support, there being frequently considerable difficulty in centering the ear and the hub, so that it is sometimes necessary to detach the ear and reattach it to the wire.

It is one of the objects of this invention to provide a trolley ear or wire support having a cavity or cavities to receive solder or cement as a means of attaching the wire thereto, so that the wire may be attached to the ear after the latter has been attached to a hub or other overhead support by applying a torch to the ear and melting the solder or cement in the cavities, which flows down around the wire and securely attaches it to the ear.

A further object of the invention is to provide a form of trolley ear or wire support which when attached to a wire will enable an ordinary round wire with my novel ear or support thereon to be used on curves and in other places where it has heretofore been the practice to use a "figure-8" wire, so called, thus doing away with the extra expense of figure-8 wire and effecting an important saving of time in the connection of sections of figure-8 wire to the sections of ordinary round wire, my novel ear or support permitting the use of round wire in continuous lengths on curves, as well as when the line is straight.

A further object of the invention is to provide a trolley ear or wire support made of two pieces of rolled tinned sheet metal formed to proper shape and then riveted or otherwise rigidly secured together.

With these and other objects in view the invention consists in certain constructions and in certain parts, improvements, and combinations which will be hereinafter described, and then specifically pointed out in the claims hereunto appended.

In the accompanying drawings, forming part of this specification, Figure 1 is a plan view of a preferred form of my novel trolley-wire support adapted for ordinary use; Fig. 2, an elevation corresponding therewith; Fig. 3, a section on the line 3 3 in Fig. 2; Fig. 4, a section on the line 4 4 in Fig. 2; Fig. 5, an elevation of a form of my novel support adapted to be used with an ordinary "figure-8 wire-clamp," so called, whereby a round wire with my novel clamp may be used in lieu of a figure-8 wire, the front section of the figure-8 clamp being removed; Fig. 6, a section on the line 6 6 in Fig. 5, showing a figure-8 clamp in place. Figs. 7 and 8 are views showing parts of the plates with modified forms of solder-recesses, but otherwise corresponding with the plates in Figs. 5 and 6; and Figs. 9 and 10 are sectional views of forms of my novel ear or wire support having the solder-cavities, but cast instead of formed from plates of sheet metal.

A denotes my novel trolley-wire support as a whole, and 20 cavities for solder formed therein, pieces of solder or cement in the cavities being indicated by 21. These solder-cavities may be made of any form or size in accordance with the judgment of the manufacturer and as best adapted for special uses to which the support may be applied, it being wholly immaterial, so far as the principle of my invention is concerned, how many cavities for solder or cement are formed in each ear or what may be their shape. It is ordinarily contemplated that the pieces of solder or cement will be stored in the cavities in assembling. This, however, is not essential, as the cavities may be formed, as in Fig. 8, so as to receive pieces of solder or cement after the plates have been secured together.

The form of my novel support illustrated in Figs. 1 to 4, inclusive, is for ordinary use, and the support comprises two sheet-metal plates 22, which may be tinned in the strip, and a cast-hub 23, the plates being shown as secured together by rivets 24. Each plate has formed at its lower edge a curved recess 25, the recesses of the two plates forming, when secured together, a socket 26 to receive the wire, the socket being preferably slightly greater than a half-circle, so that the wire requires to be sprung into it and will be held therein while being permanently attached without other means of retention, it being understood, of course, that the plates are all formed exactly alike and that any two may be placed together to form a perfect support. Each plate is also provided with depressions 27, corresponding depressions in a pair of plates forming the solder or cement cavities 20, and with a recess 28, the recesses in a pair of plates forming a socket 29 for the hub 23. The special shape of the hubs is not, of course, of the essence of my invention. Each hub is provided with a threaded hole 30 to receive the threaded shank (not shown) of the hanger, and preferably with a groove 31 to receive lips 32 on the plates 22, so that the plates will be firmly secured to the hub. The hub is also shown as provided with extensions 33, and certain of the rivets 24 pass through both the extensions and the plates, as at 24ª.

The form illustrated in Figs. 5 to 8, inclusive, is intended to be used with an ordinary figure-8 wire-clamp B. This clamp consists simply of plates 34 and 35, which may be cast or made of sheet metal, and one of which (plate 34, as shown in the drawings) has a hub 36 formed integral therewith or rigidly secured thereto. These plates are secured together in use by rivets or bolts 37. It will be noted in this form (see Fig. 6) that the figure-8 wire-clamp engages the support in the same manner that it would engage the upper portion of an ordinary figure-8 wire—that is to say, the plates or jaws of the clamp are provided with sockets 38, which receive and firmly grip an enlarged portion of the hanger—in the present instance the enlargements which form the solder-cavities 20. It will thus be seen that with this form of my novel support the use of figure-8 wire upon curves and elsewhere may be entirely dispensed with.

In the form illustrated in Figs. 9 and 10 ordinary cast-metal ears or supports are shown as provided with solder-cavities 20, it being wholly immaterial, so far as this portion of my invention is concerned, whether the support is cast or made up of plates of sheet metal or whether it is made to be used with a hub 23 or other overhead supports, as in ordinary use, or with a figure-8 wire-clamp in order to do away with the use of figure-8 wire upon curves or elsewhere.

In use, the parts of the support being secured together and solder or cement placed in the cavities to receive it, the support may be attached to the hanger or other means of suspension, (not shown,) the wire sprung into the socket to receive it, and then a torch applied to the outer side of the support to melt the solder in the cavities and cause it to run down between the plates and about the wire and rigidly secure the latter in the socket. Where the support is cast, the solder-cavities are necessarily so formed that the solder will lie contiguous to the wire, the solder in either case going exactly where it is needed and in the quantity required without waste. As the support is attached to the hanger before the wire is secured to the support, no twisting of the wire is required and all difficulty in the matter of centering the support and the hanger is avoided.

Having thus described my invention, I claim—

1. A trolley-wire support made from two plates of sheet metal and having a socket to receive the wire and a cavity above the socket to receive solder for the attachment of the wire thereto.

2. The plate 22 having a curved recess 25 extending longitudinally of the plate and adjacent to one edge thereof and a depression 27 at one side of the recess 25, substantially as shown for the purpose specified.

3. The plate 22 having a curved recess 25 extending longitudinally of the plate and adjacent to one edge thereof, a depression 27 at one side of the recess 25 and a recess 28 extending to the edge of the plate opposite the recess 25, substantially as shown for the purpose specified.

4. A trolley-wire support formed from tinned plates of sheet metal and having stored therein solder for the attachment of a wire thereto, said solder being stored at a point separate from but adjacent to its final location, whereby when melted it will flow from one point to the other.

5. A trolley-wire support formed from two plates of sheet metal having straight-edged, and permanently-formed curved recesses 25 which together form a socket slightly greater than a half-circle, so that a wire may be sprung into it and will be firmly retained therein, said plates having also corresponding recesses which together form a socket for a portion of a hanger-hub.

In testimony whereof I affix my signature in presence of two witnesses.

EBENEZER HILL, JR.

Witnesses:
E. HILL,
J. E. SLATER.